United States Patent
Huang et al.

Patent Number: 5,080,060
Date of Patent: Jan. 14, 1992

[54] PRECHAMBER COMBUSTION SYSTEM WITH FORCED INJECTION FOR TWO-STROKE GASOLINE ENGINE

[75] Inventors: Huei-Huay Huang; Yu-Yin Peng, both of Hsinchu, Taiwan

[73] Assignee: Industrial Technology Research Institute, Hsinchu, Taiwan

[21] Appl. No.: 659,724

[22] Filed: Feb. 25, 1991

[51] Int. Cl.$^5$ .................. F02B 13/00; F02B 19/10; F02M 67/02
[52] U.S. Cl. .................. 123/275; 123/257; 123/267; 123/533; 123/467
[58] Field of Search .............. 123/256, 257, 266, 267, 123/275, 292, 299, 300, 531, 533, 467

[56] References Cited

U.S. PATENT DOCUMENTS

| | | | |
|---|---|---|---|
| 1,092,109 | 3/1914 | Kempton | 123/467 |
| 1,173,745 | 2/1916 | Rundlof | 123/275 |
| 3,154,058 | 10/1964 | Warren | 123/267 |
| 3,905,343 | 9/1975 | Ryan | 123/267 X |
| 4,020,801 | 5/1977 | Jarnuszkiewicz | 123/275 X |
| 4,239,023 | 12/1980 | Simko | 123/275 |
| 4,424,780 | 1/1984 | Trucco | 123/292 X |
| 4,519,356 | 5/1985 | Sarich | 123/533 |
| 4,754,740 | 7/1988 | Emmenthal et al. | 123/533 |
| 4,794,901 | 1/1989 | Hong et al. | 123/533 |
| 4,831,982 | 5/1989 | Baranescu | 123/275 |

FOREIGN PATENT DOCUMENTS

| | | | |
|---|---|---|---|
| 1044470 | 11/1953 | France | 123/267 |
| 0003168 | 1/1987 | Japan | 123/533 |

Primary Examiner—Willis R. Wolfe
Attorney, Agent, or Firm—Cushman, Darby & Cushman

[57] ABSTRACT

The present invention relates to a fuel injection system driven by compressor. The system is used in two-stroke gasoline engine, wherein high speed air flow is applied to assist in fuel atomization and injection. The system works in such a manner that a fuel pump and fuel pressure regulating valve establish stable fuel injection pressure and fuel is injected under this stable pressure by a main fuel injector and a sub-fuel injector. The fuel is not directly injected into the cylinder, but blown into main combustion chamber of the cylinder and pre-combustion chamber of a torch-forming plug by little amount of high speed air flow supplied from a small compressor synchroinzed with the engine in operation, the high speed air flow being distributed by a distributor to flow into air passages of the main fuel injector and sub-fuel injector for blowing the injected fuel. The ignition is performed in such a manner that the pre-mixed fuel air mixture in the pre-combustion chamber is first ignited by the spark plug and is injected from a lower passage of the torch-forming plug in a flame pattern with specific shape to successively ignite pre-mixed fuel air mixture in main combustion chamber.

7 Claims, 5 Drawing Sheets

PRECHAMBER COMBUSTION SYSTEM WITH FORCED INJECTION FOR TWO-STROKE GASOLINE ENGINE

BACKGROUND OF THE INVENTION

The present invention two-stroke gasoline engine is of the scavenging type wherein through a scavenging port, fresh pre-mixed fuel air mixture flows into the cylinder and flushes the same, and the exhaust gas is scavenged through an exhaust port when the exhaust port is opened. Two shortcomings exist in such scavenging process as follows:

First, during scavenging process, the fresh fuel air mixture serving as scavenging gas flow often directly escapes through the exhaust port, causing loss of short-circuit. When the engine works under high loading condition, such loss appears more serious.

Second, during scavenging process, the burned exhaust gas is not totally scavenged and mixes with the fresh fuel air mixture. After the scavenging process ends, part of the exhaust gas remains in the cylinder, and when the engine works under low loading condition, because the scavenging gas flow is weaker, the scavenging efficiency is correspondingly lower, and consequently, the ratio of remaining exhaust gas to fresh fuel air mixture is too high. Such too high ratio is extremely apt to cause misfire of engine and lower the combustion efficiency.

The above two shortcomings are the major reasons why great amount of hydrocarbon is contained in the exhaust gas exhausted from two-stroke gasoline engine.

SUMMARY OF THE INVENTION

It is therefore a primary object of the present invention to provide a fuel injection system wherein very little air is used to assist in fuel atomization. The liquid fuel is not directly injected into the engine but blown and transferred by high speed flowing pure air and injected in form of two phase flow formed by fuel air mixture. The air can flow at very high speed via slight compression so as to atomize the fuel into extremely small fuel particle.

It is a further object of the present invention to provide the above system, wherein via control of sub-fuel injector and sub-air injector, the pre-mixed fuel air mixture is injected from sub-nozzle and fills in the pre-combustion chamber with a ratio of air to fuel maintained within a range in which the fuel air mixture can be easily ignited by the spark plug. Therefore, after the ignition of pre-combustion chamber, a torch with specific shape is formed to further ignite fuel air mixture contained in the main combustion chamber. Applying principle of ignition performed by the torch with specific shape, the ratio of air to fuel respecting fuel air mixture contained in main combustion chamber can be raised to lean mixture condition. In this condition, the fuel air mixture can still be ignited without misfiring. In other words, applying this principle, the misfiring limit of A/F ration as to fuel air mixture contained in main combustion chamber of the engine can be raised to achieve lean burn object.

The advantages of lean burn include that the fuel consumption rate of the engine in common use can be lowered, and additionally, the drawback of easy incomplete combustion occurring in two-stroke engine under low loading can be improved. For example, when the air delivery ratio is lowered to 0.2, the proportion of the exhaust gas remaining in the cylinder will be consequently too high, and therefore total misfiring or regional misfiring of the fuel gas in the cylinder is extremely easily caused to result in existence of great amount of fresh fuel air mixture in the exhaust gas. By means of the present system, under low loading use conditions, the air delivery ratio can be properly raised to increase air in-flow amount and reduce the proportion of residual exhaust gas. Also, the mixture of fuel gas injected from main fuel injection nozzle and air in the cylinder can be designed with an A/F ratio as above-mentioned lean mixture condition. In this condition, although the fuel air mixture can not be ignited by general spark plug, it can be ignited by aforesaid torch with specific shape to produce needed low torsion, whereby during combustion process, the above misfiring caused by excessive exhaust gas can be avoided to acquire higher combustion efficiency. This is one of the application features of the present system.

It is still a further object of the present invention to provide the above system which applies compression air to assist in fuel atomization and injection. Therefore, quite excellent fuel atomization is acquired to suit requirement for in-cylinder injection. Moreover, because the control of fuel injection amount depends on the fuel injector, therefore the accuracy of fuel injection amount will not be affected by contamination of a front small hole of fuel injection nozzle.

The present invention can be best understood through the following description with reference to accompanying drawings wherein:

DETAILED DESCRIPTION OF THE PREFERRED EMBODIMENT

Figure 1:
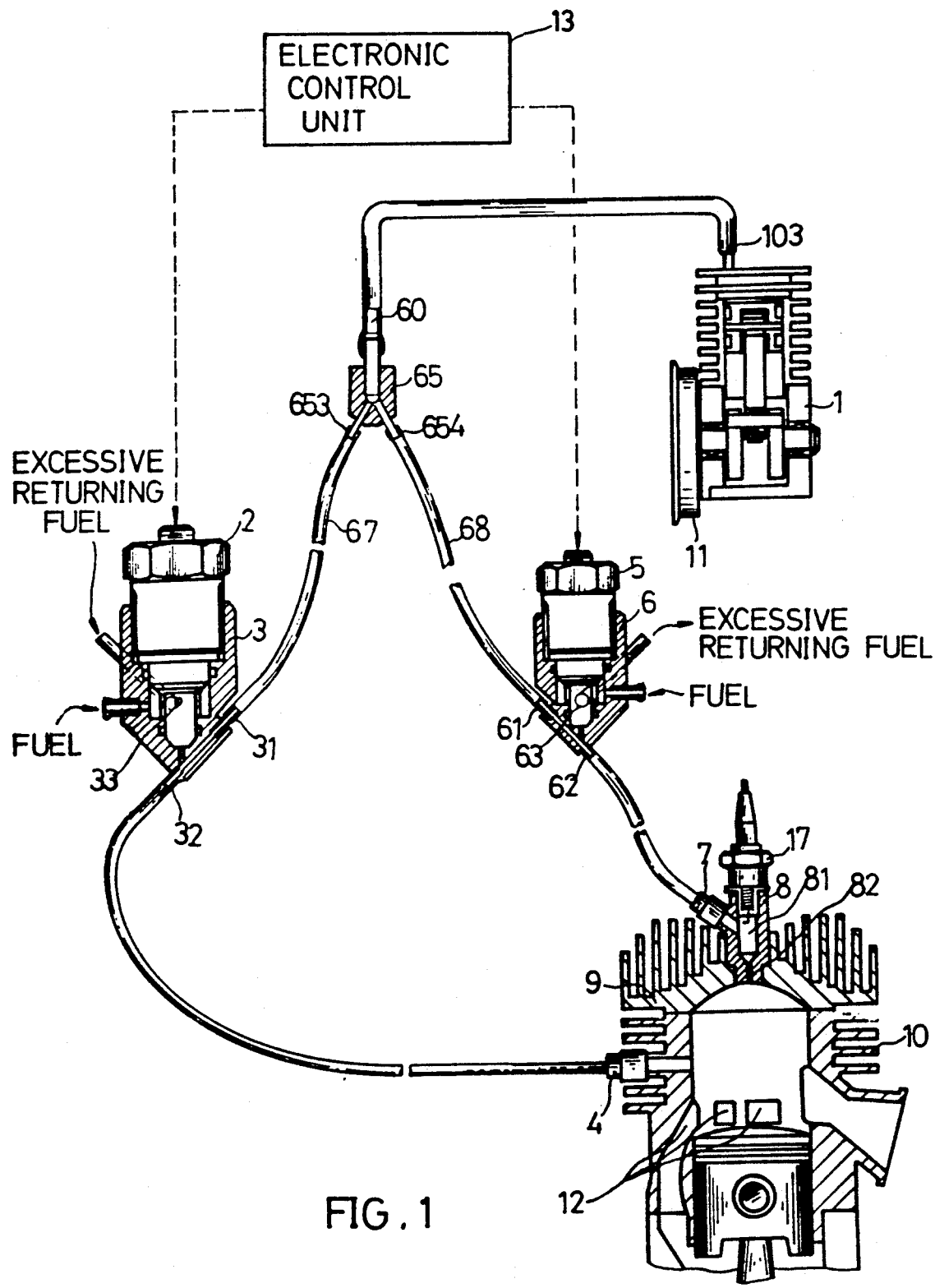
FIG. 1 is sectional working flow chart of the present invention.

Referring to FIG. 1, the combustion system of the present invention includes a small air compressor 1 which is driven by and thus synchronized with the engine in operation. Each time the engine takes a rotation, the compressor 1 outputs compressed high speed air flow through an exit 103 under a certain crank angle. The high speed air flow will flow into an inlet 60 of a distributor 65 and flow out from outlets 653, 654 at a certain ratio. The air flowing out from outlet 653 goes through a connecting pipe 67 into a main air passage 31 of a fixing base 3 on which main fuel injector 2 is mounted so as to mix with the fuel injected from main fuel injector 2 in a mixing passage 32 to form a mixture which is then transferred to a main fuel injection nozzle 4. The main nozzle is disposed on the cylinder 10 to inject the above fuel air mixture into the cylinder 10 in small particle pattern.

Furthermore, the high speed air flow flowing out from outlet 654 of the distributor 65 through the connecting pipe 68 will enter sub-air passage 61 of a fixing base 6 on which sub-fuel injector 5 is mounted, and mix with fuel injected from sub-fuel injector 5 in mixing passage 61 to form a mixture which is then transferred to a sub-nozzle 7. The sub-nozzle 7 is disposed on a torch-forming plug 8 to inject the above fuel air mixture into pre-combustion chamber 81. The fuel air mixture in pre-combustion chamber 81 will be ignited by a spark plug 17 disposed in the torch-forming plug 8 to form specifically shaped torch which is injected from torch injection hole 82 in specific pattern. The torch-forming plug 8 is disposed on cylinder head 9 and the torch injected from the torch injection hole 82 will ignite the fresh mixture of fuel injected from main nozzle 4 and pure air flowing out from scavenging passage 12.

Figure 2B:
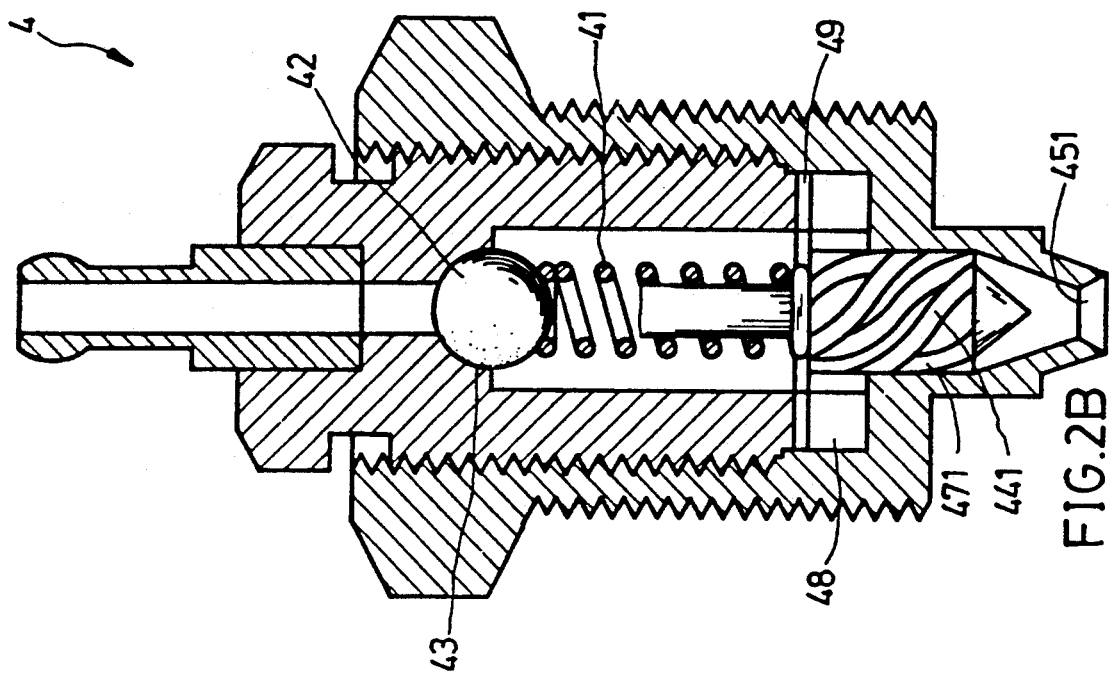
FIG. 2B is a sectional view of the main fuel injection nozzle with a screw body.
Figure 2A:
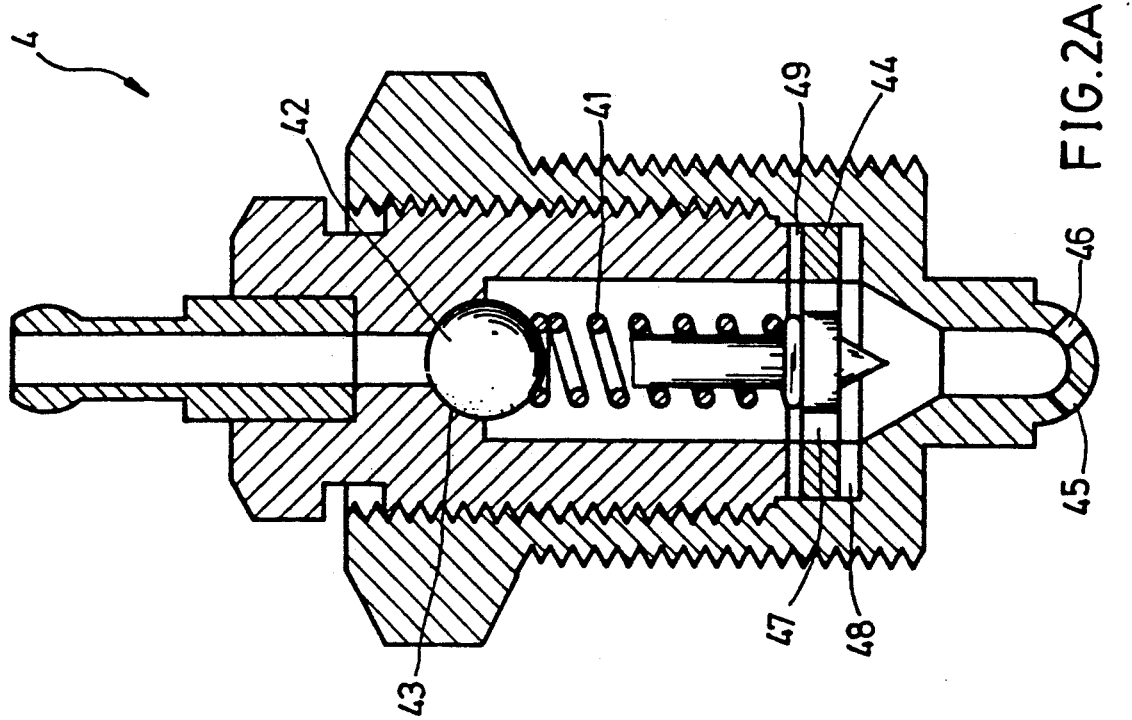
FIG. 2A is an enlarged sectional view of the main fuel injection nozzle thereof.
Figures 3A, 3B:
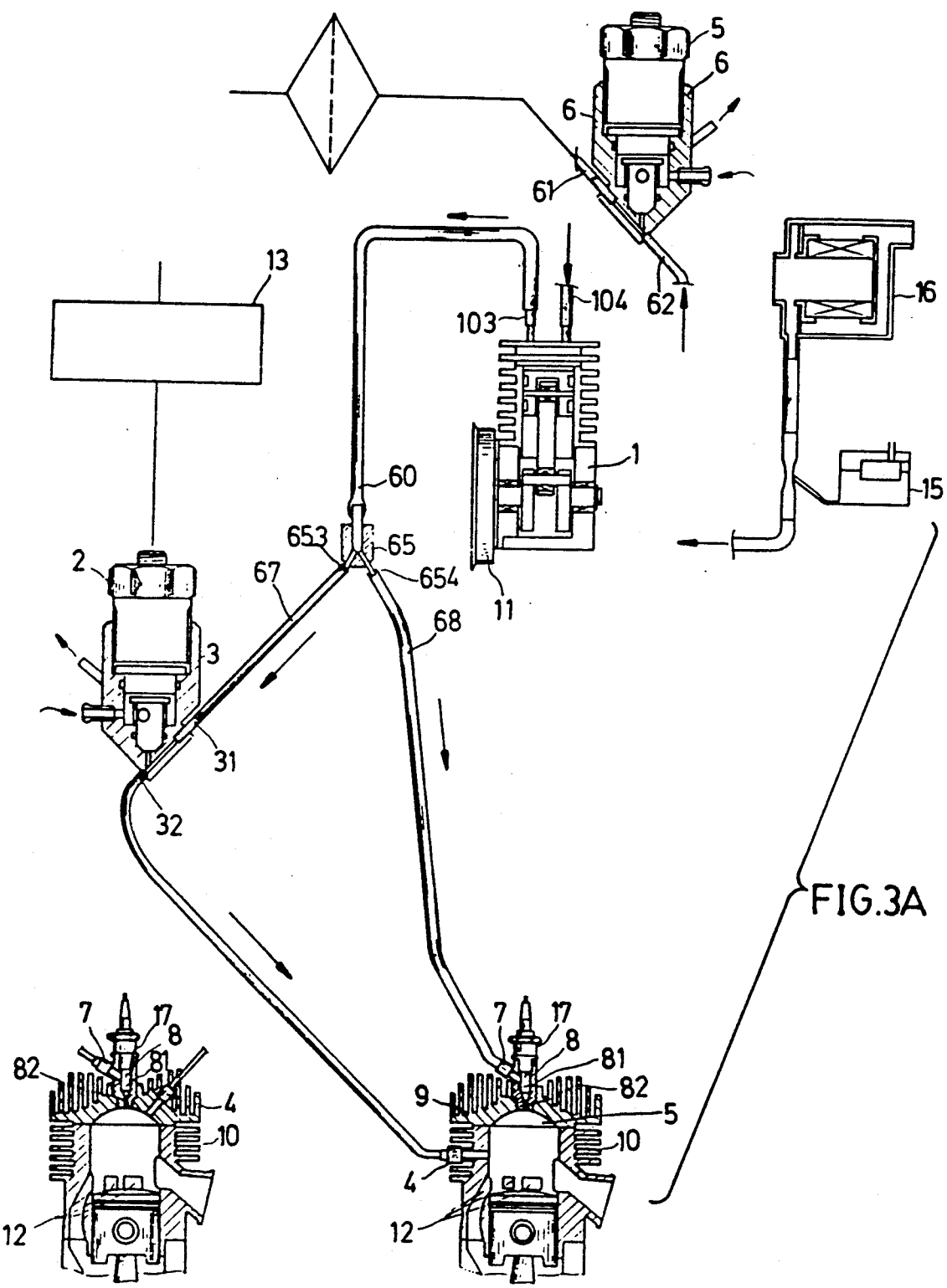
FIG. 3A shows that the sub-fuel injection electromagnetic valve is disposed in front of air compressor and is replaced with a carburetor.
FIG. 3B shows that the main fuel injection nozzle is disposed on top portion of the cylinder.

As shown in FIG. 2A, the main fuel injection nozzle 4 and sub-nozzle 7 of this invention are fuel injection nozzles capable of performing specific injection with non-return effect. When the above fuel air mixture goes into injection nozzle, it must overcome pre-loading force of spring 41 to push a valve ball 42 away from a valve seat 43 and then it goes through a tunnel 47 of a spring support 44 and is finally injected in uniform small particle pattern from injection holes at front end of the injection nozzle. Referring to FIGS. 2A and 2B, the main nozzle has an upper injection hole 45 and a lower injection hole 46 at its front end which respectively inject uniform small particle of fuel to combustion chamber of the cylinder head 9 and engine piston surface as shown in FIG. 1. When the fuel injection is completed, spring 41 will restore the valve ball 42 to the valve seat 43 so as to avoid return of high pressure gas in the cylinder. Additionally, gaskets 48, 49 are disposed to prevent leakage. In addition, as shown in FIG. 3B, when the main nozzle is disposed on top portion of cylinder, the injection holes 45, 46 are properly designed to make fuel injected toward scavenging passage 12. As shown in FIGS. 2, 4, applying the above upward and downward multiple fog beam injection principle, the fuel is evenly distributed in the cylinder. Moreover, the downward fuel fog beam is used to absorb part of the heat produced over the piston surface 34 to reduce the possibility of clog caused by piston due to overheat, and enhance the vaporization of the fuel small particle. As shown in FIG. 2B, a screw body 441 is disposed between the spring 41 and the front outlet 451 so that the fuel gas can pass through a screw groove 471 for enhancing the atomization effect of the fuel and the mixing of the fuel and air in the cylinder so as to promote combustion efficiency.

The sub-nozzle 7 is also designed with non-return effect. However, the injection hole 82 formed on front end of sub-nozzle 7 can be modified in accordance with pre-combustion chamber 81 to evenly inject pre-mixed fuel air mixture.

Please further refer to FIG. 3A. In the present fuel injection system driven by compressor 1, the sub-fuel injector 5 can be alternatively mounted in front of an air inlet 104 of the compressor 1 or can be replaced with a general carburetor 15. The injected fuel is mixed with the air flowing from air filter 16 and then is together therewith sucked into the compressor 1. After compressed, the mixture is discharged from exit 103 and enters the distributor 65 and then is discharged from outlets 653, 654 at a certain ratio. The fuel air mixture discharged from outlet 654 will be directly transferred to sub-nozzle 7, which is disposed on the torch-forming plug 8 to inject the fuel air mixture into pre-combustion chamber 81. A spark plug 17 disposed in the torch-forming plug 8 will ignite the fuel air mixture in the pre-combustion chamber 81 to form specifically shaped torch which is injected from the torch injection hole 82 in a specific pattern. On the other hand, the fuel air mixture discharged from outlet 653 will enter fixing base 3 to mix with fuel injected from main fuel injector 2 to form thicker fuel air mixture. The thicker fuel air mixture will be directly transferred to main nozzle 4 disposed on the cylinder 10. The specifically shaped torch injected from torch injection hole 82 of torch-forming plug 8 will ignite the fresh fuel air mixture formed by fuel injected from main nozzle 4 and pure air flowing from scavenging passage 12.

Figure 4A:
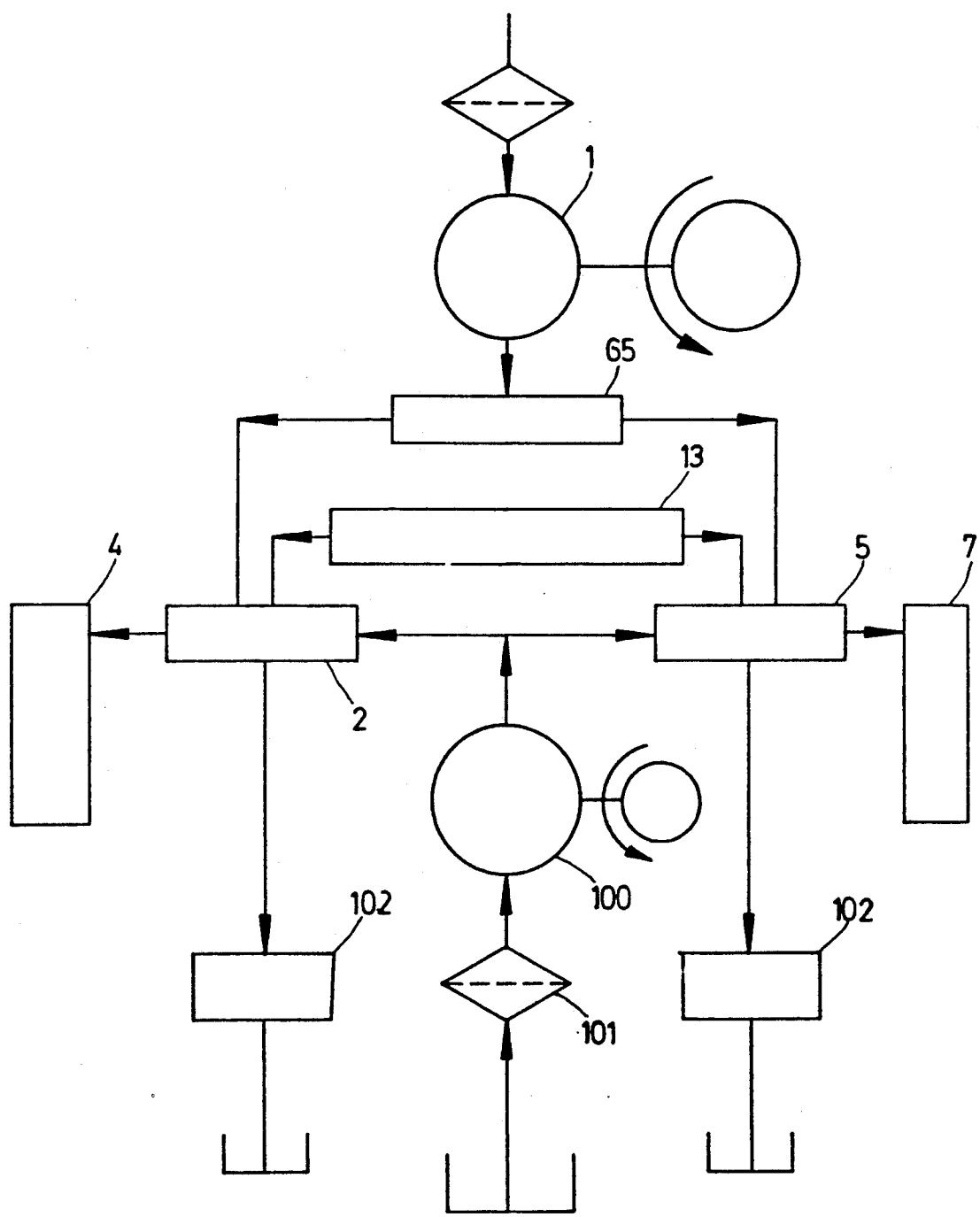
FIG. 4A is a flow chart of the present invention, wherein the sub-fuel injection electromagnetic valve is located behind the compressor.
Figure 4B:
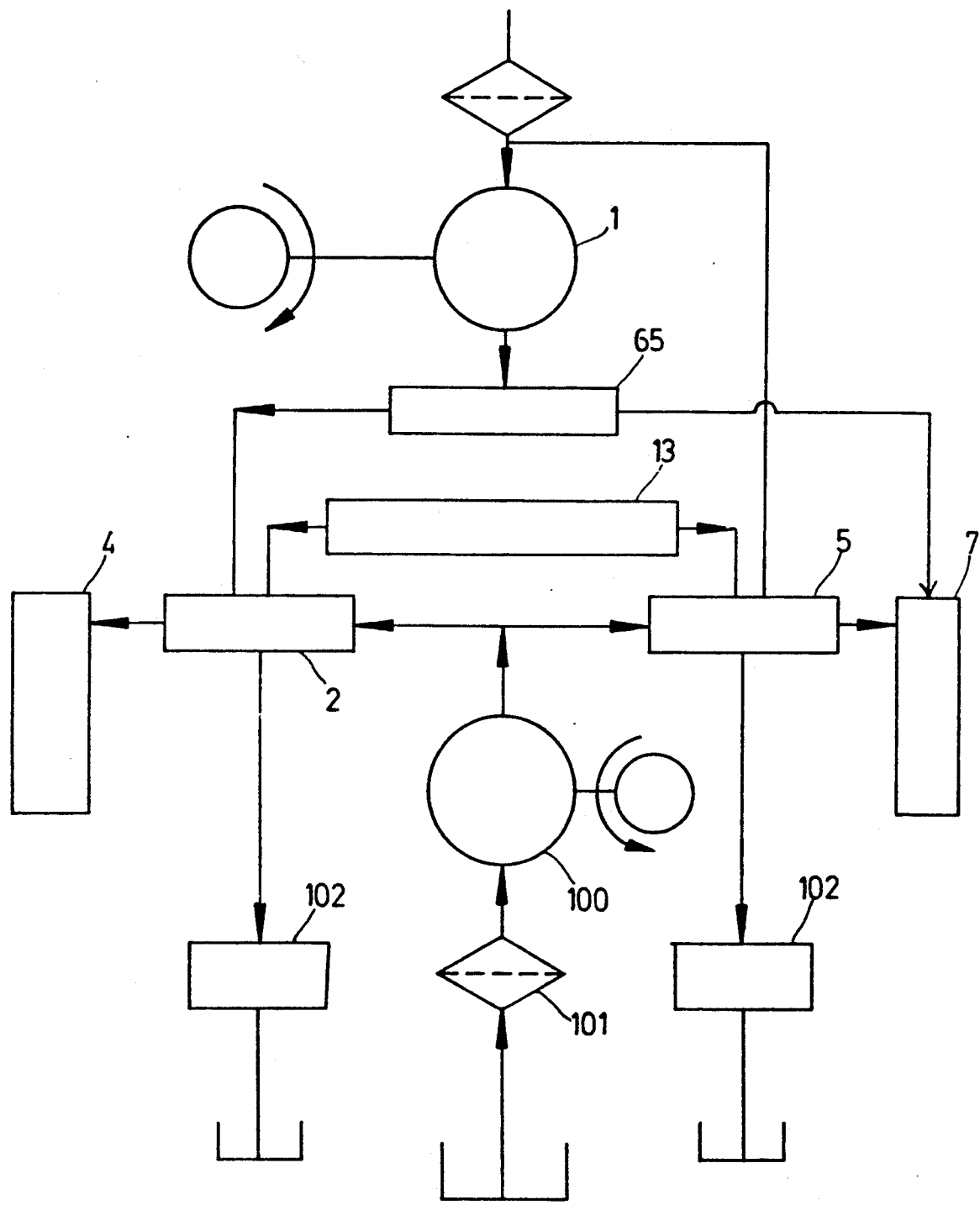
FIG. 4B is a flow chart according to FIG. 4A, wherein the sub-fuel injection electromagnetic valve is located in front of the compressor.

As shown in FIGS. 4A and 4B, the fuel pump 100 equipped with a fuel filter 101, and fuel pressure regulating valve 102 supply fuel with stable pressure for the main fuel injector and sub-fuel injector. The excessive fuel will flow back to the fuel pressure regulating valve 102 through the fuel-returning hole.

The electronic control unit 13 will control the aforesaid fuel injector and air injector by means of calculating the signals detected and transmitted by the sensors, such as engine r.p.m, reference crank angle, throttle positioning, engine inflow amount, etc., and the outputting independent current pulse.

Having described my invention as related to the embodiment shown is the accompanying drawings, it is my intention that the invention be not limited by any of the details of description, unless otherwise specified, but rather be construed broadly within its spirit and scope as set out in the appended claims.

We claim:

1. A prechamber combustion system with forced injection for two-stroke gasoline engine, comprising: an air compressor synchronized with engine in operation, a fuel supply pressure-stabilizing circuit including a fuel pump and a fuel pressure regulating valve, a distributor having and inlet connected to an outlet of said air compressor, a main fuel injector and a sub-fuel injector respectively connected to said outlet of said distributor, the fuel injection amount and time of said main and sub-fuel injector being controlled by current pulse transmitted from an electronic control unit according to the operation state of the engine, said main injector injecting fuel which is pushed by a part of compressed air toward said main nozzle and into the cylinder, said sub-injector injecting fuel which is pushed by the other part of compressed air toward said sub-nozzle, said sub-nozzle being disposed on a torch-forming plug mounted on the cylinder head, the fuel air mixture being ignited in a pre-combustion chamber by a spark plug disposed in said torch-forming plug to form specifically shaped torch which is injected from a torch injection hole so as to ignite fresh fuel air mixture formed by fuel air mixture injected from a main nozzle and pure air flowing out from scavenging passage.

2. A system of claim 1, wherein said main nozzle is designed with non-return effect, and when the fuel air mixture goes into the injection head, it must overcome pre-loading force of a spring to push a valve ball away from a valve seat and then it goes through a tunnel of a spring support and is finally injected in uniform small particle from an upward injection small hole and a downward injection small hole respectively to a combustion chamber of the cylinder head and engine piston surface, and when the fuel injection is completed, said spring restores said valve ball to said valve seat so as to avoid return of high pressure gas in the cylinder.

3. A system of claim 2, wherein said main nozzle is designed with a front end injection hole of single type or containing specific angle and is mounted on top portion of the cylinder so as to inject fuel toward main scavenging passage.

4. A system of claim 2, wherein a screw body with screw groove is disposed in front section of said fuel nozzle, said front section being formed with a single hole at front end thereof, said screw body being disposed on top portion of the cylinder and faced toward main scavenging passage so as to make fog fuel fully mixed with the air.

5. A system of claim 1, wherein said sub-fuel injector is disposed in front of said air compressor.

6. A system of claim 5, wherein said sub-fuel injector is replaced with a device applying fuel-supplying manner of a carburettor.

7. A system of claim 1 or 2, wherein said sub-nozzle is similar to main nozzle in structure and is designed with non-return effect and the injection hole formed on front end thereof can be modified according to said pre-combustion chamber so as to evenly inject in the pre-mixed fuel air mixture.

* * * * *